(12) United States Patent
Aagesen

(10) Patent No.: US 7,019,861 B2
(45) Date of Patent: Mar. 28, 2006

(54) COMPUTER PRINTER CONTROL METHOD

(76) Inventor: Jan Olof Bjerre Aagesen, Tibbovagen 27, DK-2730 Herlev (DK)

( * ) Notice: Subject to any disclaimer, the term of this patent is extended or adjusted under 35 U.S.C. 154(b) by 0 days.

(21) Appl. No.: 10/405,565

(22) Filed: Apr. 2, 2003

(65) Prior Publication Data

US 2003/0164977 A1    Sep. 4, 2003

Related U.S. Application Data

(63) Continuation of application No. PCT/GB01/04442, filed on Oct. 3, 2001.

(30) Foreign Application Priority Data

Oct. 3, 2000    (GB) .................................... 0024208

(51) Int. Cl.
*G06F 15/00*    (2006.01)
(52) U.S. Cl. ..................... 358/1.15; 358/1.18; 358/468
(58) Field of Classification Search ................ 358/1.1, 358/1.2, 1.12, 1.13, 1.14, 1.15, 1.16, 1.17, 358/1.18, 468
See application file for complete search history.

(56) References Cited

U.S. PATENT DOCUMENTS

| 6,119,137 A | 9/2000 | Smith et al. |
| 6,525,831 B1 * | 2/2003 | Evans, IV .................. 358/1.15 |

FOREIGN PATENT DOCUMENTS

| EP | 0 665 486 A2 | 8/1995 |
| GB | 2 342 195 A | 4/2000 |

* cited by examiner

*Primary Examiner*—Mark Wallerson
(74) *Attorney, Agent, or Firm*—Alston & Bird LLP

(57) ABSTRACT

A method of controlling print operations via a print server and a printer, the method comprising the steps of: routing a datastream representative of a document to be printed from a workstation to the print server; causing the print server to determine from the datastream the type of document to be printed; causing the print server to determine a print format for the document by reference to a first lookup table; and causing the print server to directly command the printer to print the document in the determined print format.

14 Claims, 3 Drawing Sheets

COMPUTER PRINTER CONTROL METHOD

CROSS-REFERENCE TO RELATED APPLICATIONS

This application is a continuation of International Patent Application No. PCT/GB01/04442 filed Oct. 3, 2001, which designated inter alia the United States and was published under PCT Article 21(2) in English.

FIELD OF THE INVENTION

The present invention relates to computer printers and in particular to computer printers wherein a datastream representing a document to be printed by a printer is routed thereto via a print server.

BACKGROUND OF THE INVENTION

In a modern office environment it is common for there to be provided a network comprising a plurality of computer workstations which are linked to one or more printers via a central print server. The print server is adapted to receive inputs from each of the workstations and to forward such inputs as outputs to the one or more printers. In effect the print server acts as a hub through which the workstations must communicate in order to print a document.

Taking as an example an operator using a workstation to type a document using word processing software, once the document has been completed the operator instructs the software to print the document. This is typically achieved by selecting a print command from a menu or desktop icon. The workstation then generates a datastream representing the completed document which is sent to the print server via the network. The print server then forwards the datastream to a printer whereupon it is printed in the form in which it was represented upon the screen of the workstation. When more than one of the workstations is in use and a plurality of operators are typing and wishing to print documents, the print server holds the incoming datastreams in a queue before sending them in an ordered manner to the or each printer.

Printers of the type currently in use are operable to print documents in range of print formats and in a range of print qualities. The print formats may range from a Draft format having toner or ink saving capabilities and intended to be used for proof reading purposes, to a Final Letter format having a much greater resolution and intended, for example, to be sent to a client. Typically the printer may also be operable to print on one or both sides of a sheet of paper, operations referred to as simplex or duplex respectively, and to print more than one page of a document on one side of a sheet of paper. This latter operation involves the printer reducing the size of a page and, depending upon how many pages are printed on a side, referred to as 2-UP (2 pages), 4-UP (4 pages) etc. It is also typical for a printer to have a plurality of paper trays having therein paper of different qualities, for example copy for draft documents and bond for letter quality documents. Finally, a printer may be provided with a plurality of different coloured inks which enable it to print documents in colour. It will thus be appreciated that the or each printer is able to print documents in a wide variety of different styles or qualities.

Selecting which of the options referred to above should be enabled for a specific document can usually be done in one of two ways. Firstly, a workstation operator may, prior to printing a document, access a print properties menu provided in the word processing software. The menu allows the operator to specify the intended format and quality of the finished document. When instructing the word processing software to print the document, commands corresponding to the format and quality are included in the datastream. When the datastream reaches a printer, the commands alter the printer settings so that the document is printed in the format specified by the operator. Alternatively the printer settings can be set manually as typically a printer is provided with an exterior control panel which an operator can utilise to change the printer settings.

Printer consumables, for example paper and ink and toner cartridges are expensive and any wastage thereof represents a monetary loss to a company. Additionally, companies which deal in commercially sensitive information are required to have waste paper disposed of in a confidential manner, for example by shredding, which again is an expense.

The workstation/print server/printer arrangement described above has the drawback in that it does not enable the printers to be operated in the most cost effective manner and is conducive to unnecessary wastage of printer consumables. The root causes for this may be many. For example it is unlikely that a workstation operator will set out to print a document in the most cost effective manner. The operator may not fully comprehend the capabilities of a given printer nor may they be aware of the multitude of user specific options available in the print properties menu of a word processing package. Alternatively time pressures may preclude an operator from selecting the optimum configuration and format for a given document. The use of the control panel on a printer may not be possible due to the distance between a workstation and the printer. Even when an operator has taken the opportunity to specify a cost effective format for a document there may still be problems. For example, an operator may specify that a document should be printed on copy paper and send the print command to the print server, however the copy paper tray of the printer may be empty. In such a circumstance the printer may default to another of its paper trays and print the document on more expensive bond paper.

Advances in computer technology have made the phenomenon of "hot desking" increasingly popular in an office environment. Typically a plurality of workstations are arranged in a network. The network may be a Local Area Network (LAN), for example within a single office building, or a Wide Area Network (WAN), for example linking LANs at different locations within an organisation. Each workstation and output device in the network has a unique address, and each user a unique ID and password. Each user has a nominal "home" workstation where it is expected they will carry out the majority of their work.

When a user moves to a different workstation on the network they log in using their ID and password. A central registry within the network is interrogated and the user's profile and accompanying files are found and delivered to the workstation wherein the user has logged on.

Currently, once all the user's files have been delivered to the workstation, the network maintains the original associations for output devices, for example printers. This has the effect of sending any print requested by a user to the "home" or default printers which may be on a different floor or in a different building, country or even continent.

SUMMARY OF THE INVENTION

According to a first aspect of the present invention there is provided a method of controlling print operations via a print server and a printer, the method comprising the steps of:

routing a datastream representative of a document to be printed from a workstation to the print server;

causing the print server to determine from the datastream the type of document to be printed;

causing the print server to determine a print format for the document by reference to a first lookup table; and causing the print server to directly command the printer to print the document in said print format.

The present invention provides a method whereby the print server automatically identifies the type of document to be printed and then selects a print format appropriate to the document. The print format is advantageously the most cost effective print format for the document given the capabilities of the printer.

For example, where a workstation operator wishes to print a hard copy of an e-mail to place in a manual file or to attach hand-written notes, the print server will first determine from the datastream sent by the workstation that the document is an e-mail. The print server will then consult the first lookup table which may say, for example, that e-mail prints are to be printed on copy paper using a low print resolution. The low print resolution may correspond to an ink or toner saving setting. The lookup table may additionally reflect that where the e-mail runs to more than one document page, then it is to be printed 2-UP. If it runs to more than two logical pages in 2-UP then duplex printing will preferably also be invoked. Print commands to this effect are then sent by the print server to the printer to enable it to print the document in the appropriate print format. Preferably the print commands comprise an extra datastream element. Preferably the print commands are prefixed to the datastream. In the preferred embodiment these print commands override any user specified print commands sent by the workstation operator in the datastream to the print server.

Preferably the method includes the step of enabling the first lookup table to be customised, for example by an IT technician or systems administrator. This enables print formats to be added, deleted or changed. This may be deemed necessary to accommodate new types and formats of documents it may be desired to print or, if the printer is changed or replaced, to take into account extra print features present in the new printer.

Preferably the first lookup table includes some or all of the following print formats: Text Final Duplex, Text Final Simplex, Colour Final Duplex, Colour Final Simplex, Draft Duplex, Draft Simplex, Draft Colour Duplex, Draft Colour Simplex, E-Mail Print (Draft Duplex, 2-UP), Presentation Draft Simplex and Presentation Final Simplex. It will be appreciated that the above list is not intended to be exhaustive but merely to reflect certain possibilities. The contents of the first lookup table will be dependent upon such factors as the inherent capabilities of the printer, the type of documents required to be printed to name but two. There may be provided in the print server a further store or registry of print format overlays which may, as required, be applied to print jobs routed through the print server. These overlays are over and above the print formats stored in the first look up table and may comprise, for example, stylistic effects or requirements which are to be present in the printed document. The provision of such a store or registry makes it possible to pool printers or re-route a print job to other printers without loosing the ability to add a print format overlay to a print job.

The method may include the step of causing the printer to return to a default setting once a document has been printed. Alternatively the printer may remain at the setting corresponding to the last document to be printed. The method may permit a print server selection to be overridden by a specific operator command at the workstation.

In an alternative embodiment there may be provided a plurality of printers with which the print server can communicate. In such an embodiment the method has the intermediate step of:

after determining a print format for the document by reference to the first lookup table causing the print server to select one of the plurality of printers, said selected printer having attributes appropriate to the print format, and said printer being selected by reference to a second lookup table, and the print server thus directly commanding the selected printer to print the document in the print format.

The print server is thus able to send the datastream to the printer within said plurality of printers which is best able to print the document. The method may include the step of enabling the second lookup table to be customised, for example by an IT technician, so that the characteristics of individual printers, or the group of printers as a whole, can be added, amended or removed as appropriate. In an alternative embodiment the creation maintenance and updating of this table may be accomplished automatically. Such automatic printer enumeration may be accomplished by utilising such communication protocols as those based on IEEE 1284 and SNMP.

Preferably the method includes the additional step of causing the print server to identify the selected printer to the source of the datastream, i.e. an individual workstation. The identification of the selected printer may be displayed in text message. This is especially useful if the datastream has been re-routed to a printer whose location is not familiar to the operator. The text message may include directions to enable the operator to find the selected printer. Additionally the message may inform a user as to the time it will take to print a particular document.

The method may further include the step of determining the location of the selected printer by reference to a third lookup table. The third lookup table may be consulted after the printer has been selected from the second lookup table, or alternatively before the selection from the second table. By choosing a location from the third table, a printer will be selected which is in the vicinity of the workstation and not so remote as to be impractical.

According to a second aspect of the present invention there is provided a computer program product comprising a computer readable medium having thereon computer program means which, when loaded on a computer, causes the computer to analyze an incoming datastream, said datastream being representative of a document to be printed, to determine from the datastream the type of document to be printed; to cause the computer to determine a print format for the document by reference to a first lookup table; and to cause the computer to directly command a printer to print the document in said print format.

Preferably the computer is a print server. Preferably the computer program product is adapted to allow the first lookup table to be customised so as to reflect a plurality of print formats. The program product may enable the computer to command one of a plurality of printers to print the document where a plurality of printers are provided. In such an embodiment the program product, after determining a print format for the document by reference to the first lookup table, causes the computer to select one of the plurality of printers, said selected printer having attributes appropriate to the print format, and said printer being selected by reference to a second lookup table; and causes the computer to directly command said selected printer to print the document in the print format. As with the first lookup table, the program product is preferably adapted to enable an IT technician to customise the second lookup table so that the characteristics of individual printers can be added, amended or removed as appropriate. In a preferred embodiment the program product additionally causes the computer to identify the selected printer to the source of the datastream, i.e. an individual workstation.

According to a third aspect of the present invention there is provided a method of allocating print resources within a network, the method comprising the steps of:

providing a plurality of workstations and printers arranged in a network;

providing each workstation and printer with an unique address within the network;

providing users of the network with a unique identifier;

enabling a given user to log on to a workstation in the network using said unique identifier; and allocating to the workstation where the user has logged on adjacent print resources.

The invention of the third aspect automatically uses the local generic print driver located on the workstation at which a user has logged on, and utilises the local print server. This prevents any documents which the user requires to be printed from being sent to print resources allocated to the user's "home" workstation. The term adjacent refers to the print resources being easily accessible by the user to collect a printed document. Allocation of the print resources preferably involves the use of a register or lookup table provided on the network. The register/lookup table cross-references the physical locations of the network components, i.e. workstations, printers and print servers, with their unique addresses within the network. Thus, when a user logs on at a workstation, the network is able to retrieve from the register/look-up table a list of printers and their attendant print server(s) which are adjacent the workstation where a user has logged on. Print commands from the workstation are then sent by the generic print driver to a print server identified from the register/lookup table. The register lookup table may be provided in the central network server and be updatable, for example to take into account additions or deletions of network hardware.

According to a fourth aspect of the present invention there is provided a computer program product comprising a computer readable medium having thereon computer program means which, when loaded on a computer, causes the computer to recognize a user logging on to a workstation within a network, to transfer data particular to that user through the network to the workstation, and to allocate print resources to that workstation.

It will be readily understood that the method of the first and third aspects may be combined, and similarly the program products of the second and fourth aspects.

According to a fifth aspect of the present invention there is provided a method of allocating print resources within a network, the network including a plurality of print servers and printers, the method comprising the steps of:

providing a connection means to enable a portable workstation to be connected to the network;

connecting a portable workstation to the network;

allocating an address to the portable workstation;

causing the portable workstation to interrogate the network to find a compatible print servers;

selecting a compatible print server which controls a printer having a physical location closest to the physical location of the allocated address; and causing print commands from the portable workstation to be sent to said selected compatible print server.

The above method enables a user to connect a laptop, palmtop, personal data assistant, or like portable device to a network, and software installed on the device automatically selects the closest available printer to the connection point. This eliminates the need for a user to manually select a print server and printer prior to printing a document. The portable device is preferably provided with a generic print driver program, and when interrogating the network seeks print servers configured to receive inputs from the generic print driver. The connection means to the network may not be a physical connection. Preferably the method may include the step of causing the print server to identify the physical location of the or each printer served thereby to the user, to enable the user to promptly recover printed documents.

The selection of a compatible print server is achieved as follows. Once the portable workstation has been allocated its address, it then interrogates the network. The network is provided with a register which cross-references the unique addresses of all the components of the network with their physical locations. Thus the network is able to provided a listing of printers having locations relative to physical location of the portable workstation, together with the address of the print server or servers serving those printers. Selection of printers may be governed by criteria such as their being located within a given distance of the location of the portable workstation, or being on the same floor of a building as the portable workstation to name but two examples.

According to a sixth aspect of the present invention there is provided a computer program product comprising a computer readable medium having thereon computer program means which, when loaded on a computer which is subsequently connected to a network, causes the computer to interrogate the network to identify a print server of the network compatible with print driver software of the computer, and to cause print commands from the computer to be routed to a print server thus selected. Preferably the computer is a portable computing device, for example a palmtop, laptop or personal data assistant.

It will be readily understood that the method of the methods of the first and fifth aspects may be combined, and similarly the program products of the second and sixth aspects

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
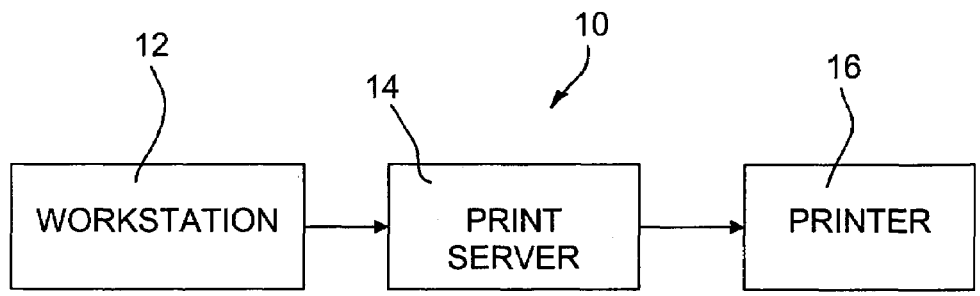
FIG. 1 shows a schematic representation of a network having a single workstation, a print server and a single printer.

Referring firstly to FIG. 1 there is shown a rudimentary network, generally designated 10, comprising a workstation 12, a print server 14 and a printer 16. As described above print commands are sent from the workstation 12 to the print server 14 via a print input path 18 within the network 10. The print server 14 then sends the print commands to the printer 16 via a print output path 20.

It will be understood that the term "print server" is intended to cover an entity which functions in the manner described, and hence may be considered to be embodied by a software product. Such a software product may preferably be provided in a separate hardware entity or server with which workstations 12 communicate. Alternatively a software product embodying the print server function may be provided on a workstation 12 which serves both as a workstation and a print server. In the embodiment where the print server software is carried in a separate hardware component, the software is compatible with the hardware component regardless of the manufacturer, type, make or model of the hardware. Similarly the software is compatible with system printers irrespective of their manufacturer, type, make or model. Thus it will be appreciated that the print server 14 is able to send print commands to all printers on a given network, as well as any new printers added to the network.

In accordance with the present invention the print server 14 is provided with a print program which is adapted to optimise the operation of the printer 16. To this end the workstation 12 is provided with a generic print driver program which is the only print driver present on the workstation 12. The generic print driver program is compatible with the workstation, be it a PC or a lap/palm top, irrespective of the manufacturer, make, model or type thereof. The generic print driver program is also compatible with all models of printer irrespective of their make, manufacturer or type. The generic print driver program is thus able to send print to all printers on the network and any new printers added thereto. In use, the print driver program converts the representation of a document displayed on a screen of the workstation into a series of commands which, when received by the printer 16 enable it to physically reproduce the document on a sheet of paper. The print commands are sent to the print server 14 and then to the printer 16 as a datastream.

The print program operates in the following manner. An incoming print datastream from a workstation 12 is analyzed by the program to determine the type of document a user is wishing to print. The print program looks for "tokens" or "indicators" as to which category the document may be classified. For example, if the datastream includes instructions to the printer 16 to include a letterhead, the program may deduce that the document is a Final letter. The tokens or indicators may include the structure of the datastream or specific words or phrases therein.

Once the document has been classified, the program consults a first lookup table which cross-references the document type with pre-specified print commands particular to that document type. Taking the above example of a Final letter, the print commands may include a command that the letter be printed on bond paper with a high ink density. The print commands from the lookup table are then prefixed to the data stream which is then forwarded to the printer 16.

Figure 2:
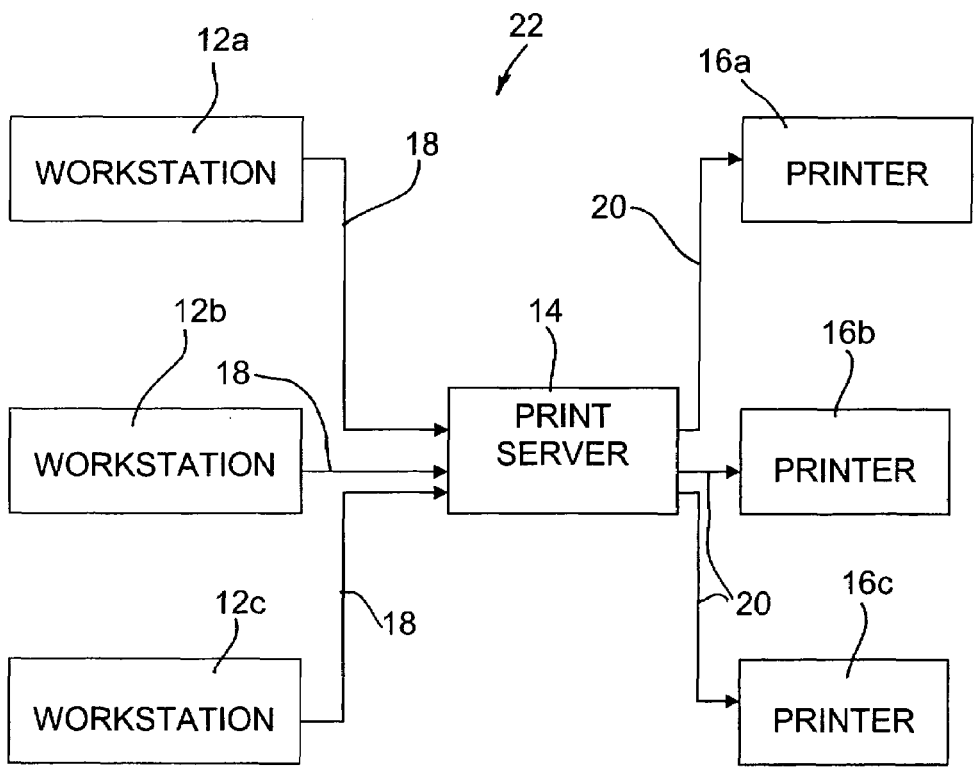
FIG. 2 shows a schematic representation of a network having a plurality of workstations, a print server and a plurality of printers.

FIG. 2 shows a more complex network, generally designated 22, which comprises three workstations 12a, 12b, 12c, a print server 14 and three printers 16a, 16b, 16c. The printers 16a, 16b, 16c may not be the same and hence capable of printing different document configurations. For example, a first printer 16a may be colour capable, a second printer 16b may be duplex capable, and a third printer 16c may be capable of printing two logical pages on one physical side of paper.

In such an embodiment the print program is provided with a second lookup table which lists the print capabilities of each printer on the network. In use, the print program having identified the type of document to be printed and prefixed the datastream with the appropriate print commands consults the second lookup table to ascertain which printer is best able to print the document. The datastream is then sent to the printer identified from the second lookup table. Advantageously the print program sends a message to the workstation which generated the data stream which informs the user of the location of the printer where the document has been printed. The present invention also enables the user to be provided with an accurate indication of the time it will take to print a document. Existing printing systems are able to provide an estimate of the printing time, however these systems base the estimate on a standard print format. In the present invention the print server is aware of the print jobs in a print queue together with the required format for those print jobs. The server is thus able to calculate the actual print time for each job and thus advise user as to the actual print time for their print job.

It will be understood that after consulting the second look up table there may exist more than one printer suitable for the print job in hand. Thus it will be appreciated that the printers may be "pooled" which is to say the print job may be sent to either printer as circumstances may require. The use of the generic print driver program, and the compatibility of the print server with all printers on the network, enables print pooling to be accomplished cross platform regardless of the manufacturer, type, make, model or installed features of the suitable printers. Known print pooling methods are achievable only with identical printers. The pooling of the printers is dynamic, as the allocation of a print job to a first printer may automatically be changed to another printer with similar print abilities if changes in the first printer printing capabilities occur. For example the first printer may run out of paper or experience a paper jam.

Figure 3:
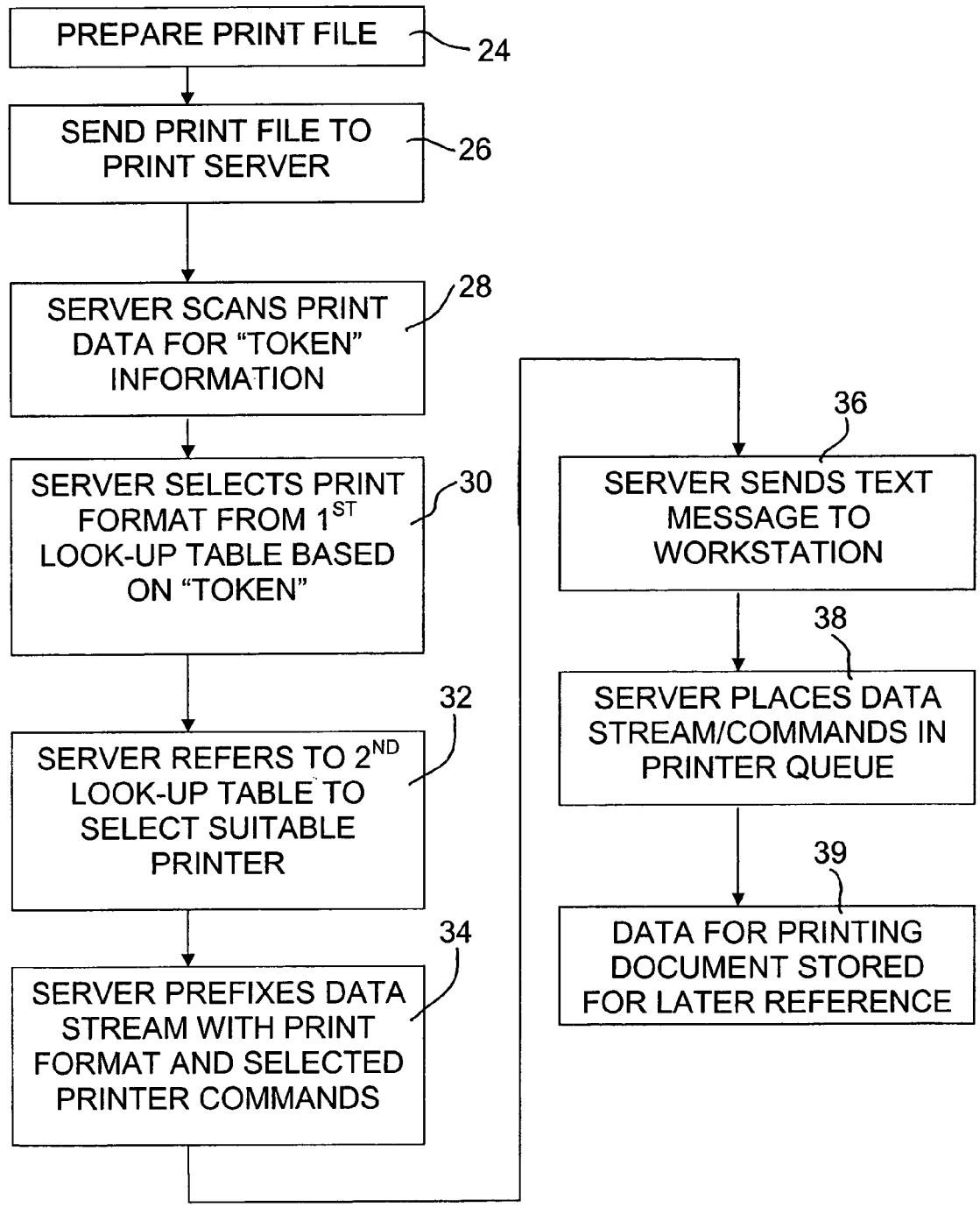
FIG. 3 shows a diagrammatic representation of a method according to an aspect of the present invention.

A schematic representation of the method is shown in FIG. 3 where the following reference numerals correspond to the following steps:

24—Print file prepared by the PC application (word processor),
26—Print file data stream sent to the Print server by the generic print driver loaded on the PC,
28—Print program on the print server scans the print data stream looking for format or "token" information,
30—Print program identifies document type from format or "token" and selects from a first look-up table print commands particular to the document type, 32—Print program refers to a second look-up "table" containing information on the capabilities (features) of the printers attached to the server looking for a match between the document type and the features of the printer, 34—Print program prefixes the print data stream with the appropriate commands for the selected printer to achieve the print output required by the selected document type, 36—Print program issues text message to the instigating workstation and user ID indicating the printer that has been selected with its physical location (optional), 38—Print program places print data stream with prefixed commands in the queue to the selected printer. (It may issue a text message to the instigating workstation and use ID of the estimated time to completion.), and 39—Data relating to the printing of the document may be stored for later reference (optional).

The data relating to the printing of the document may include such information as, for example, the number of prints, the format of the print (duplex, toner save etc.) and an identification of the user and or file to which the print relates (time/date/user-id/print job/application etc.) The information thus recorded may be used for a number of purposes including the following. The information may be used for the purpose of print accountability. The cost of printing documents within an organisation can be accurately allocated to the relevant users, departments and/or jobs. Such allocation is known but has the drawback that printing is allocated on a fixed price per print basis. The present invention, in taking into account the print format, is thus able to allocate a more accurate print cost to each job.

The stored data may also be utilised in the situation where the printers are owned or administered by a company or organisation outside of the that where the printers are used, and where a management or "click" charge is levied. By monitoring the types of print job undertaken the click charge can be modified to reflect the actual use profiles of the printers. The data can also be used to quantify the actual savings in consumables such as paper, toner and ink cartridges which have been made possible as a result of the invention. Also the data can be used for what is termed "Green Accounting". The reduced environmental stress made possible by the invention can be quantified by examining the instances where the invention has, for example reduced the number of pages required for a given print job by, for example, printing in duplex form.

The system described above may also be adapted for networks where "hot desking" is possible. Where a roving user logs onto a different workstation from their normal "home" workstation, network software delivers the roving user's profile and files to the workstation where the user has logged on. The generic print driver of the workstation interrogates the network to find a nearby print server having the print program thereupon. When the user prints a document it will be sent to a nearby printer and not through the network to the printer normally associated with the user's "home" work station.

A further embodiment of the present invention relates to the use of portable computing devices, such as laptops, and the connection thereof to a network.

When a laptop is connected to the network, the network assigns to the laptop a unique address. A program present on the laptop then interrogates the network looking for print servers which are compatible with the generic print driver installed on the laptop. If such a print server is found, then the software program will configure the generic print driver to route print commands to this server. If a plurality of compatible servers are found, then the software program will select the print server which serves a printer located closest to the physical location of the address assigned to the laptop. subsequent print commands will be routed to this server.

Figure 4:
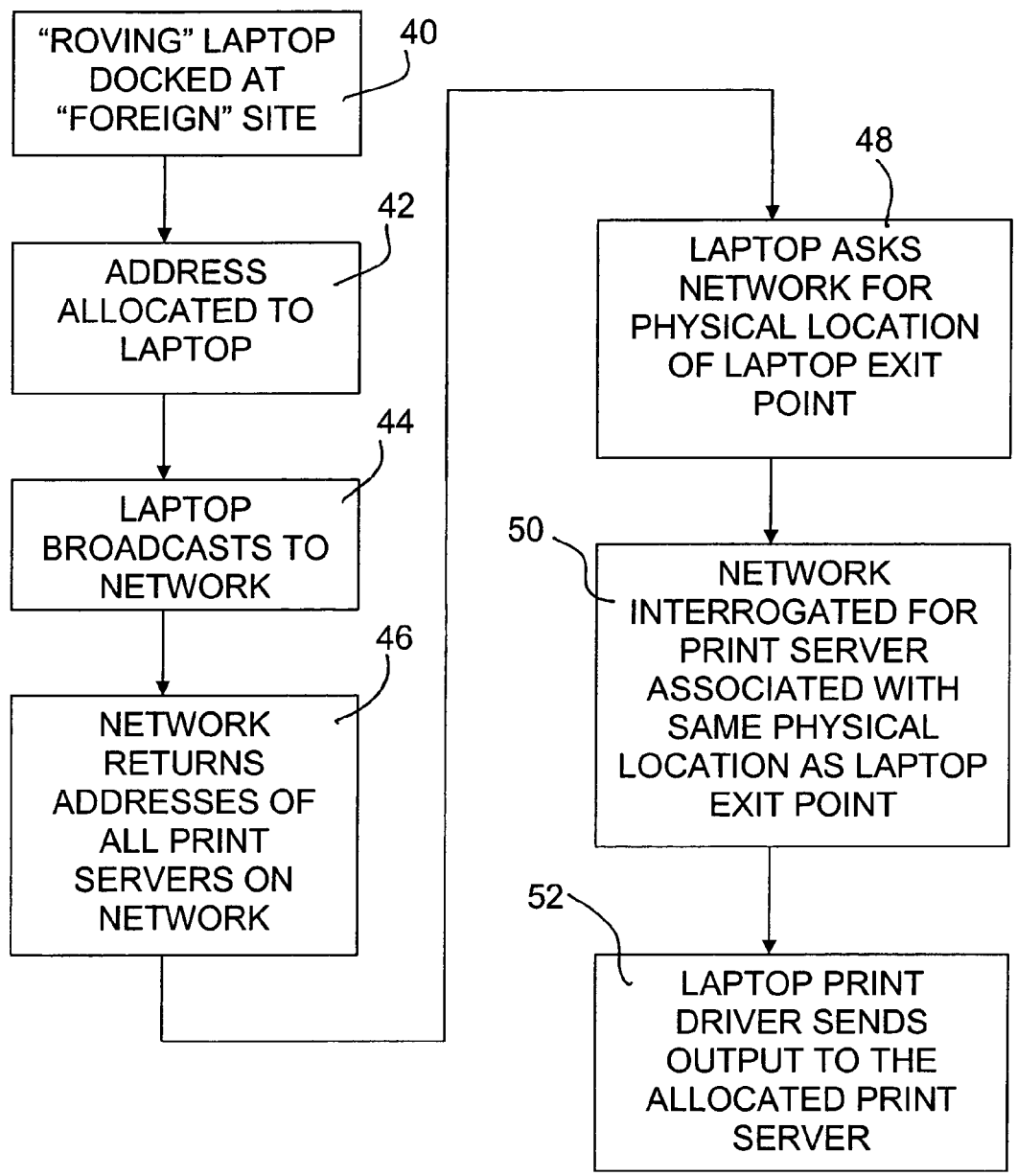
FIG. 4 shows a diagrammatic representation of a method according to a further aspect of the present invention.

A schematic representation of the method is shown in FIG. 4 where the following reference numerals correspond to the following steps:

40—Roving laptop "docked" at "foreign" site,

42—Network software allocates an address to the laptop,

44—Software on the laptop "broadcasts" to the network looking for all print servers, 46—Network returns information on the addresses of all print servers on the Local network, 48—Laptop software, knowing its address, enquires of the network the physical location of the exit point related to the address, 50—Network interrogated, using the physical location of the laptop exit point, for the print server servicing printers on the same physical location as the laptop exit point, and 52—Laptop software delivers all output from the generic print driver to the allocated print server.

Step 50 utilises a register provided on the network which lists both the unique addresses of the network hardware and the physical locations of said hardware and enables cross references to be made between these two data fields. Thus, once the laptop has been assigned its unique address, it is able to access the register, determine the physical location of this address, and then obtain the addresses of printers and print servers located relative to its location. The criteria by which the printers and print servers may be chosen may, for example, include their being located within a given distance from the laptop. In a similar manner, the above method may be applied to the principal of a "roving printer". Accordingly if a printer of the network is moved to another location on the network the print server will note this change in location and automatically make the services of the printer available to relevant users of the network at this new location.

Advantages of the present invention include better utilisation of print resources, cost reductions in consumables such as printer paper and inks, reduced end user frustration, and better control over printed document standards.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of controlling print operations via a print server and a printer, the method comprising the steps of:
   routing a datastream representative of a document to be printed from a workstation to the print server;
   causing the print server to determine from the datastream the type of document to be printed;
   causing the print server to determine a print format for the document by reference to a first lookup table in the print server; and
   causing the print server to directly command the printer to print the document in said print format, wherein the step of commanding the printer to print the document in a selected print format is accomplished by a print command being sent by the print server to the printer, and the print command comprises an additional datastream element.

2. A method as claimed in claim 1, wherein the print command is prefixed to the datastream representative of the document to be printed.

3. A method as claimed in claim 1, wherein said print command overrides any user-specified print command sent by the workstation operator in the datastream to the print server.

4. A method as claimed in claim 1, the method including the step of causing the printer to return to a default setting once a document has been printed.

5. A method as claimed in claim 1, wherein there are provided a plurality of printers.

6. A method as claimed in claim 5, the method including the intermediate step of:

after determining a print format for the document by reference to the first lookup table, causing the print server to select one of the plurality of printers, said selected printer having attributes appropriate to the print format, and the print server commanding the selected printer to print the document in the print format.

7. A method as claimed in claim 6, wherein one of the plurality of printers is selected by reference to a second look up table.

8. A method as claimed in claim 6, the method including the additional step of causing the print server to identify the selected printer to the workstation being the source of the datastream.

9. A method as claimed in claim 8, wherein the identification of the selected printer is displayed in text message on the workstation.

10. A method as claimed in claim 9, wherein the text message includes directions to enable an operator to find the selected printer.

11. A method as claimed in claim 9, wherein the text message includes information relating to the actual time to print the document on the selected printer.

12. A method as claimed in claim 5, wherein the method further includes the step of determining the location of the selected printer by reference to a third lookup table.

13. A method as claimed in claim 1, the method including the step of storing information relating to the printing of a document in a database of the print server.

14. A method as claimed in claim 1, the method including the additional step of storing one or more print format overlays in the print server, and applying a print format overlay to a document prior to printing thereof.

* * * * *